United States Patent
Korotaev et al.

(10) Patent No.: US 10,536,533 B2
(45) Date of Patent: Jan. 14, 2020

(54) OPTIMIZATION OF PACKETIZED DATA TRANSMISSION IN TCP-BASED NETWORKS

(71) Applicant: Acronis International GmbH, Schaffhausen (CH)

(72) Inventors: Kirill Korotaev, Moscow (RU); Stanislav S. Protassov, Moscow (RU); Serguei Beloussov, Singapore (SG)

(73) Assignee: ACRONIS INTERNATIONAL GMBH, Schaffhausen (CH)

( * ) Notice: Subject to any disclaimer, the term of this patent is extended or adjusted under 35 U.S.C. 154(b) by 648 days.

(21) Appl. No.: 15/236,539

(22) Filed: Aug. 15, 2016

(65) Prior Publication Data
US 2017/0048328 A1    Feb. 16, 2017

Related U.S. Application Data

(60) Provisional application No. 62/204,597, filed on Aug. 13, 2015.

(51) Int. Cl.
| | |
|---|---|
| *H04L 29/08* | (2006.01) |
| *H04L 29/06* | (2006.01) |
| *H04L 29/12* | (2006.01) |
| *H04L 12/861* | (2013.01) |

(52) U.S. Cl.
CPC ............ *H04L 67/141* (2013.01); *H04L 49/90* (2013.01); *H04L 61/1511* (2013.01); *H04L 67/1036* (2013.01); *H04L 67/28* (2013.01); *H04L 69/16* (2013.01); *H04L 69/326* (2013.01)

(58) Field of Classification Search
CPC ... H04L 67/00–67/143; H04L 65/10–65/1083; H04L 69/00–69/329; H04L 61/15–61/1511; H04L 49/90–49/9094
See application file for complete search history.

(56) References Cited

U.S. PATENT DOCUMENTS

| | | | |
|---|---|---|---|
| 2003/0161321 A1* | 8/2003 | Karam | H04L 45/12 370/395.21 |
| 2004/0255048 A1* | 12/2004 | Lev Ran | G06F 9/546 709/249 |
| 2006/0031921 A1* | 2/2006 | Danforth | H04L 63/10 726/1 |
| 2014/0258365 A1* | 9/2014 | L'Heureux | H04L 69/16 709/203 |
| 2016/0277411 A1* | 9/2016 | Dani | H04L 63/20 |

* cited by examiner

*Primary Examiner* — Clayton R Williams
(74) *Attorney, Agent, or Firm* — Arent Fox LLP; Michael Fainberg

(57) ABSTRACT

A method for optimization of a standard TCP connection. The optimization is based on load distributions by a system kernel. A proposed architecture includes an application running a proxy-process. The application is connected locally to an assigned port (e.g., port 9000). A number of connections N (for example 4) is established to a proxy server located on the cloud storage. Thus, the application is not directly connected to a front end server. Instead, it is connected to the proxy process via a local port. The proxy process transfers redistributed data streams to the proxy server on the cloud, which combines N data streams into one and passes it to the front end server residing on the cloud.

20 Claims, 6 Drawing Sheets

OPTIMIZATION OF PACKETIZED DATA TRANSMISSION IN TCP-BASED NETWORKS

TECHNICAL FIELD

This disclosure is generally directed to methods for optimization of slow networks, and more particularly, to optimization of standard Transmission Control Protocol (TCP) network connections by redistribution of loads at a system kernel level.

BACKGROUND

A modern trend for using network connections for sending and receiving large volumes of packetized data over long distance (often between continents) presents some problems with regards to a high round trip time (RTT) and a high number of lost packets (P-lost). In other words, these networks have long delays and can have many undelivered (i.e., lost) packets. The conventional TCP mechanism does not work well in these situations—i.e., a size of the TCP window decreases automatically, resulting in a low number of transferred packets.

The TCP window determines maximum bandwidth of a connection channel. For example, if 1 MB of data can be transferred at one instance, but the latency (RTT) of the channel is 200 msec, only 5 MB of data can be transferred over 1 sec period, even if the physical channel bandwidth is 100 MB. In other words, a channel with a high bandwidth would still produce a very low data transfer rate in this case. Often, this occurs not due to physical limitations of the channel, but because of restrictions in how network providers manage bandwidth and divide it among multiple users—a problem that is particularly acute in long-distance data transmission. This issue is not adequately addressed by any existing network optimization solutions.

Several customized protocols are used in order to compensate for shortcomings of the TCP, for example, UDP-based Data Transfer protocol (UDT) and Reliable WAN Transfer Protocol (RWTP) by TIXEL Inc. These protocols essentially offer a TCP-like service, implementing customized similar ideas and methods, where the transfer window is regulated by other rules and can be much larger than typical TCP window, such as, for example, a 100 MB window. Unlike the conventional TCP, if the packet is lost, the size of the transfer window is not immediately affected. In the conventional TCP, if three packets are lost, the size of the TCP Window is reduced by 50% and then begins to increase and gradually reaches the initial size. Unlike the TCP, these alternative solutions attempt to increase the size of the transfer window or at least keep the same size of the window in case of losses of packets.

These approaches cause several problems. A server cannot service a large number of clients, because windows from each of the clients are accumulated on the server when the size of the TCP Window is increased. For example, in case of 1,000 clients, e.g., 100 GB may be required for connections only. In case of a larger number of clients, an enormous volume of memory may be needed. Another problem is limitations of the Network Address Translation (NAT) mechanism, which needs to be addressed. See, e.g., https://en.wikipedia.org/wiki/UDPholepunching. For example, UDP hole punching will not work with symmetric NAT devices (also known as bi-directional NAT) which tend to be found in large corporate networks, etc. However, the original TCP does not have these problems, because the load is evenly balanced among the sockets. Yet the standard TCP can be slow and inefficient in terms of RTT and P-lost.

Accordingly, an efficient method for optimization of standard TCP network connections by redistribution of loads at a system kernel level is desired.

SUMMARY OF THE DISCLOSURE

Accordingly, the present disclosure is directed to methods and systems for optimization of standard TCP network connections by redistribution of loads at a system kernel level that substantially obviate one or more of the disadvantages of current methods and systems known in the art.

In one aspect, a method for optimization of a standard TCP connection is provided. The optimization is based on load distribution by a system kernel. A proposed architecture includes an application (e.g., a backup service) running a proxy-process. The application is connected locally to an assigned port (e.g., port 9000). A number of connections, N (for example 4) are established to a proxy server (e.g., located on a remote cloud storage infrastructure). Thus, the application is not directly connected to a cloud front end server. Instead, it is connected to the proxy process via a local port. The proxy process transfers redistributed data streams to the proxy server in the cloud, which combines the data streams into one and passes it to a front end server for storage.

A data stream may be any data, arriving via more than one network packet. A data stream may consist of a single data object or of multiple objects. Each data stream may have its own routing to speed up transfers. For example, if several networking cards (Ethernet, Wi-Fi, etc.) are available, all of them can be utilized for data transfers.

One or more intermediate servers can be used to optimize routing and speed up transfers. For example, data from New Zealand to Europe can go both through Asian or US intermediate servers. Data transfer from the proxy-process to the proxy server may proceed through these one or more intermediate servers, with optimization according to the present disclosure being implemented between the intervening connections in order to optimize the overall transmission.

Additional features and advantages of the disclosure will be set forth in the description that follows, and in part will be apparent from the description, or may be learned by practice of the exemplary aspects of the disclosure. The advantages of these aspects and the general disclosure will be realized and attained by the structure particularly pointed out in the written description and claims hereof as well as the appended drawings.

In a first general aspect, the present disclosure provides a method for optimizing Transmission Control Protocol (TCP) network connections, the method including: instantiating a proxy process by an application; connecting the application to the proxy process via a local port; establishing two or more connection channels between the application and a remote proxy server via the proxy process; receiving two or more data streams from the connection channels, at the proxy server; combining the data streams from the connection channels into a sequential data stream; limiting memory usage on a front end server by setting a limit on a socket buffer size for receiving incoming data packets for each connection channel; and passing the sequential data stream from the proxy server to the front end server for storage.

In an alternative aspect, the method further includes a step of redistributing the data streams over the connection channels using a redistribution algorithm.

In an alternative aspect, the method further includes a step of dynamically controlling the number of connections and/or data streams, by the application, based upon network conditions, connection quality, or bandwidth levels.

In an alternative aspect, the method further includes the steps of transparent proxying of local TCP connections via DNS hooking; and returning back local addresses that are transparently proxied to the remote front end server. In a further aspect, the DNS hooking is implemented by a DNS-resolver.

In an alternative aspect, the remote server resides on a cloud infrastructure.

In an alternative aspect, the data streams contain packets and the data streams are combined into a sequential data stream at the proxy server based upon data contained in the packets' headers.

In an alternative aspect, the data streams comprise packets and each packet incoming into a socket buffer of the proxy server is read into an application buffer limited in size to 64 KB.

In an alternative aspect, the proxy server receives the sequential data stream from the proxy server by: reading the incoming data packets for each connection channel into a socket buffer; reading the socket buffer data packets into an application buffer having a preselected size of 64 KB or less, wherein a separate application buffer is allocated for each connection channel; and receiving the application buffer data packets at one or more incoming sockets.

In a second general aspect of the disclosure, a system for optimization of standard TCP network connections by redistribution of loads at a system kernel level is disclosed, the system including a processor configured to perform the steps of any of the methods disclosed herein.

In third general aspect of the disclosure, a computer program product embedded in a non-transitory computer-readable storage medium is disclosed, the computer-readable storage medium comprising computer-executable instructions for optimization of standard TCP network connections by redistribution of loads at a system kernel level is disclosed, the medium including instructions for performing the steps of any of the methods disclosed herein.

This simplified summary of exemplary aspects of the disclosure serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BRIEF DESCRIPTION OF THE FIGURES

The accompanying drawings, which are incorporated into and constitute a part of this specification, illustrate one or more example aspects of the present disclosure and together with the detailed description, serve to explain their principles and implementations

DETAILED DESCRIPTION OF SELECTED ASPECTS

Figure 1:
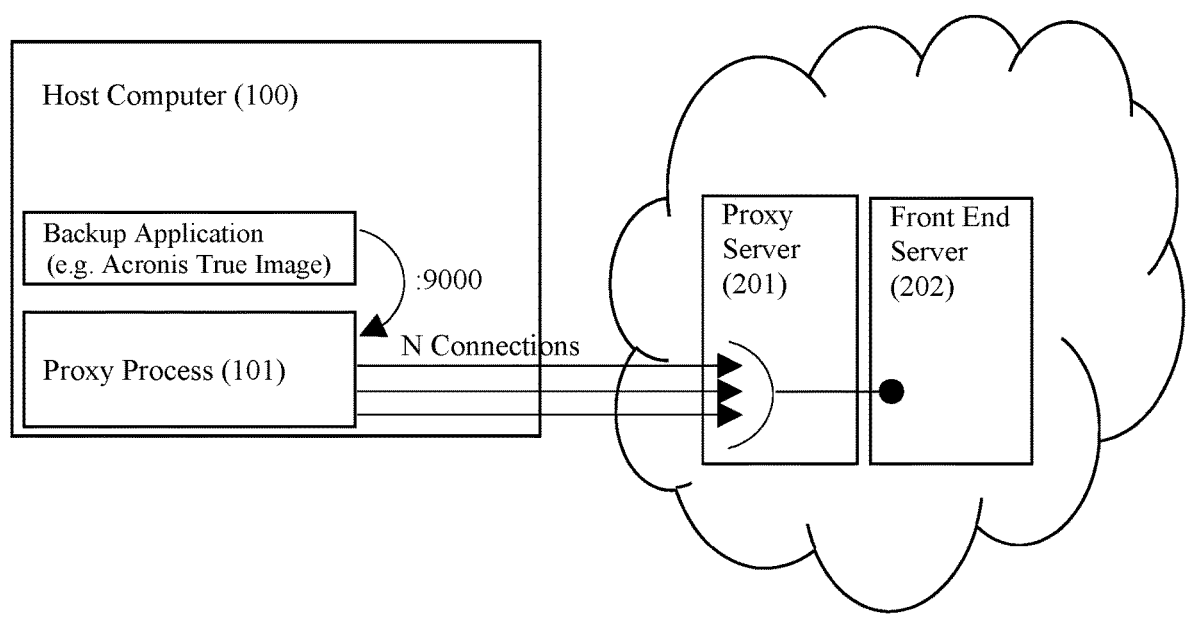
FIG. 1 illustrates a proposed architecture, in accordance with an exemplary aspect of the disclosure.

Exemplary aspects of the disclosure are described herein in the context of a system, method, and computer program product for optimization of standard TCP network connections by redistribution of loads at a system kernel level. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying, drawings. The same reference indicators will be used to the extent possible throughout the drawings and the following description to refer to the same or like items.

Network programming is often implemented using sockets as a standard data structure. A socket serves as a communication endpoint between two processes. Servers create sockets, bind to selected ports, listen and accept connections from clients, while client programs, on the other hand, create sockets to connect to servers and exchange information. In most cases, a server is designed to accept multiple connections from different clients, and will either fork a new process to serve each client request (i.e., a concurrent server) or serve one client's request before accepting more connections (i.e., an iterative server).

Socket programming is typically implemented using standard system calls. For example, in most Linux distributions, a server-based application will create a socket using the socket( ) system call. In most cases, it would then bind on a well-known port using bind( ) and wait for connections from clients using the listen( ) system call. The server then establishes a connection by responding to incoming requests from clients using accept( ) Concurrent servers may then fork a new process (or thread) to serve each incoming client request. On the other end of the connection, each client application creates a control socket using socket( ) and then calls connect( ) to establish a connection with the server. The client application will then normally create a separate socket for data transfer using socket( ) and bind to an unprivileged port using bind( ) before calling listen( ) on this unprivileged port to detect an incoming data transfer from the server. Upon detection of a transmission, the client may accept( ) to establish a connection to send and receive data. Data streams may be transmitted between the client and server using read( ) write( ) and other standard system calls, with a close( ) call used to end the connection.

Once a TCP/IP connection is established between a client and server, data packets may be transmitted (e.g., as part of a data stream). The TCP protocol accounts for packet loss and asymmetric transmission capabilities of the host and client, e.g., by using a TCP window parameter, which sets forth the amount of data that may be transmitted before an acknowledgement from the recipient is required. As noted elsewhere in the disclosure, the TCP window may be increased or decreased based upon the rate of dropped packets. For example, as packets are dropped the TCP window will typically be reduced in size. As a result, a client connecting to a server using an unstable connection (e.g., geographically remote connection requiring multiple hops) will tend to experience reduced bandwidth due to transmission inefficiencies and overhead resulting from a smaller TCP window. As such, the theoretical maximum bandwidth available to the client may be unattainable in this scenario.

The TCP window also presents a limitation for clients with a high bandwidth connection. By default, the original TCP standard specifies a maximum TCP window of only 64 KB. However, for high bandwidth clients, maximum theoretically throughput may only be achieved using an increased window size (e.g., as implemented by alternative protocols other than TCP, or by a modified version of the TCP standard). Scaling the TCP window upward beyond 64 KB to accommodate high bandwidth clients may solve this issue, but at a cost to the server: the server-side side socket buffer must increase to accommodate larger incoming transmissions. This concomitant increase in memory requirements is prohibitive for servers with a large number of clients, as noted above, and may result in a hardware-level resource bottleneck.

The present disclosure overcomes these and other limitations associated with methods currently known in the art by providing methods and systems that optimize standard TCP network connections by redistribution of loads at a system kernel level. Such methods are advantageous, as they provide optimized system while maintaining conformity to the TCP specification (e.g., avoiding the need for a TCP window size above the maximum set forth in the TCP standard). Moreover, methods according to the disclosure are resistant to intermittent packet loss, allowing clients to maintain a high speed connection to a remote server (e.g., the proxy server, 201) despite connecting from a distant geographic location or via an otherwise unstable connection.

In one aspect, a method for optimization of a standard TCP connection is provided. The optimization is based on load distributions by a system kernel. FIG. 1 illustrates a proposed architecture. An application (which may be a backup service, as in this exemplary aspect, or another application, e.g., file synchronization, data replication, etc.) 100 runs a proxy process 101. The application 100 is connected locally to an assigned port (e.g., port 9000). A number of connections, N (for example 4) are established to a proxy server 201 (e.g., located on the cloud storage). Thus, the application 100 is not directly connected to a front end server 202. Instead, it is connected to the proxy process 101 via a local port. The proxy process 101 transfers data streams to the proxy server 201 (located, e.g., in the cloud). In select aspects, the data streams are redistributed.

In alternative aspects, the proxy process is executed by the application, automatically or in response to user input. In further aspects, the proxy process is executed at a predetermined time (e.g., as part of an automatic backup routine). The application, proxy process and methods of the disclosure may be configured to automatically run at predetermined intervals or in response to triggering conditions or a policy established for a given computer or user. As such, select aspects of the disclosure encompass software that performs automatic remote backup, synchronization, and storage routines by carrying out methods according to the disclosure. Execution of the application and/or proxy process, as well as the transmission of data to a remote server may occur transparently to a user of the computer on which the application is installed.

Parameters of the application (e.g., the port used for the local connection between the application and the proxy process; the number of connections, N; and the network interface(s) used to connect to the proxy server) may vary based upon preconfigured application settings, user or computer policies, or user input. For example, in select aspects the port parameter is preconfigured by the application. In alternative aspects, the port is automatically set by the application based upon an analysis of other software or hardware installed on the computer (e.g., a scan intended to identify unused ports). Similarly, the number of connections (N) to the proxy server may be preset, based upon a policy associated with a user or computer, or selected by a user. Similarly, the application may select one or more hardware or virtual network interfaces available on a given computer based upon preconfigured application settings, based upon a policy associated with a user or computer, or selected by a user. In select aspects, multiple network interfaces are used simultaneously (e.g., to maximize available bandwidth). In other aspects, the one or more network interfaces may be selected for use in the disclosed methods based upon network conditions (e.g., the application may monitor the quality of a given connection and automatically switch to an alternative network interface when conditions satisfy a given threshold or trigger). Policies may be established in order to enable or prioritize particular network interfaces under particular conditions (e.g., the application may be set to prioritize a wired interface over a cellular or wireless interface).

As noted above, the number of connections (N) to the proxy server may vary. In select aspects, this parameter is dynamically adjusted by the application in order to optimize the connection to the proxy server. In some aspects, the application may monitor the connection quality between the proxy service (or application) and the remote proxy server, and adjust N based upon a monitored parameter, e.g., dropped/lost packets, average or instantaneous bandwidth, latency, or any other network connection quality metric. In select aspects, N may be preset by a policy applied to a particular user, computer, or network interface. For example, in select aspects, additional network connections N may be used when a wired interface is used to connect to the proxy server.

In a general aspect of the disclosure, the proxy server may be any server besides the computer on which the application is running. In a preferred aspect, the proxy server is a remote server (e.g., located in the cloud) or otherwise geographically remote from the computer on which the application is running. Such configurations are likely to particularly benefit from the disclosed methods of optimization. However, aspects of the disclosure also encompass configurations wherein the server is in proximity to the transmitting computer but which would benefit from the optimized methods of transmission disclosed herein. In alternative aspects, the proxy service may be configured to transmit data (e.g., files to be backed up or synchronized) to multiple proxy servers. For example, the application may be configured to backup user data on a computer to a local data center as well as a long-term archival data center in order to ensure that multiple backup copies are preserved.

In preferred aspects of the disclosure, data streams transmitted from the proxy process to the proxy server are redistributed across the N network connections in order to balance the load or otherwise enhance and/or optimize the transmission of data to the proxy server. In select aspects, packets selected for transmission to the proxy server may be allocated to one of the two or more network connections based preset criteria, priority or policy rules, and/or algorithms. In select aspects, packets are allocated to a given data stream based upon information stores in the packet header.

In alternative aspects where different network interfaces are used simultaneously, packets may be allocated to a given data stream based upon priority parameters assigned to the network interfaces. In select aspects, the number of data streams may be dynamically adjusted by the application based upon one or more network parameters. For example, the application may monitor the connection quality, average or instantaneous bandwidth or other network parameters and initiate/terminate data streams in response to one or more of these parameters. In select aspects, the application may be configured to run a routine intended to identify an optimal number of data streams, e.g., by systematically varying the number of connections (N) and/or data streams, while monitoring and evaluating the rate and or quality of the transmission of data to the proxy server. In select aspects, the number of data streams and/or connections is determined based upon information provided by the proxy server, e.g., a diagnostic data or recommended settings may be advertised by the proxy server to clients periodically or at the time that an initial connection is established.

In some aspects, the proxy process and/or the application modifies the header of packets transmitted to the proxy server, e.g., by inserting a unique identifier into the header of each packet that can be used by the proxy server to recombine the data streams into a single sequential data stream. In select aspects, the identifier is a serial number, alphanumeric identifier or other code that establishes an order of the packets (e.g., by uniquely identifying segments of the original data prior to the data being partitioned into two or more data streams by the proxy process and/or the application).

Figure 2:
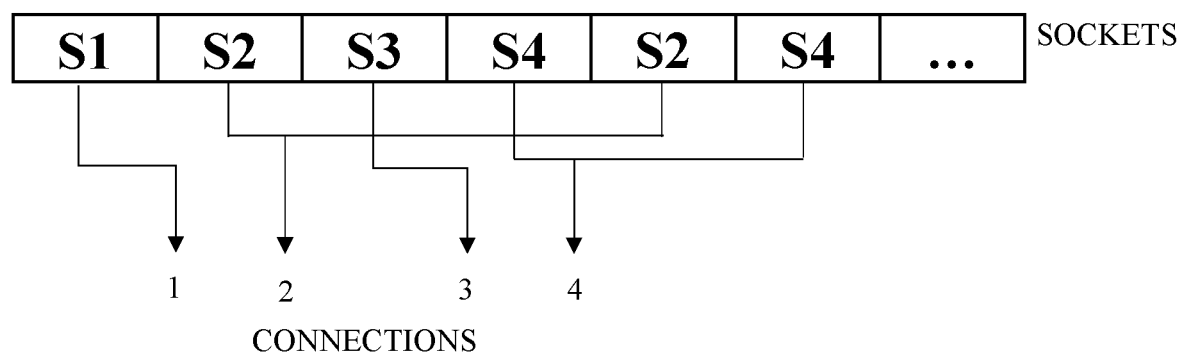
FIG. 2 illustrates an algorithm for redistribution of a data stream over N connections.

According to a further exemplary aspect, redistribution of data streams over N connections is implemented using special algorithms, such as, for example, a round-robin algorithm. A special redistribution algorithm is depicted in FIG. 2, which demonstrates an exemplary algorithm of how the data can be distributed through N connections, with the sockets shown on top, and the data streams being directed to the various connections (numbers at bottom).

According to a further exemplary aspect, the data streams are combined at the proxy server 201 based on data contained in the packets' headers. The proxy server 201 collects data from all the incoming N data streams and passes the resulting sequential data stream to the front end server 202. In select aspects, the front end server is configured to store the data indefinitely (e.g. a data archive).

According to a further exemplary aspect, the DNS of the proxy server 201 can be substituted for by a special DNS-resolver. This way, when the application 100 is connected to a front end server 202 (e.g., http://fes.acronis.com), the DNS-resolver redirects this connection to a local address. Then, the proxy process 101 is launched and starts transferring data to the proxy server 201 over N connections, as discussed above.

Figure 3:
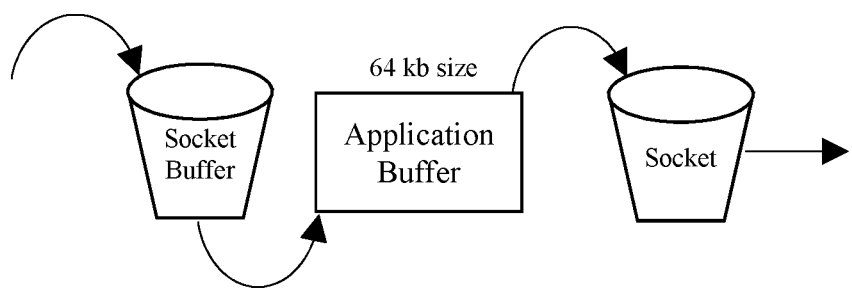
FIG. 3 illustrates control of memory loads on a front end server, in accordance with an exemplary aspect of the disclosure.

FIG. 3 illustrates control of memory loads on a front end server, in accordance with an exemplary aspect. According to this aspect, principles of load distribution at a system kernel level are used. Each packet incoming into the socket buffer is read into an application buffer of 64 KB in size. If the incoming packet is out of order, it is left in the buffer and the process stops polling the socket. Since no more data is read out of the socket, the operating system may then begin to allocate buffer space for the given socket based on the host situation. The process stops reading data from the sockets, and the OS kernel controls memory on its own.

A similar process may be implemented when the outgoing socket is slower than the incoming socket. As soon as the kernel reports an out-of-write-space condition in the outgoing socket, one or more (e.g., all) incoming sockets may be set to stop polling. Thus, the data received is collected on the sockets by the kernel up to some limit.

As shown in FIG. 3, in exemplary aspects of the disclosure, each of the one or more incoming data streams is received in a socket buffer. Then, the data is passed on to an application buffer (limited in size, e.g., to 64 KB). Thus, in this aspect each connection channel always has a 64 KB buffer. For 10,000 clients this amounts to 640 MB of memory. Thus, the server memory load remains rather low, even if a very large number of clients send data to a storage server. Accordingly, the connection channel is optimized by the system kernel on one side and is also optimized by the proposed system having 64 KB buffers for each of the connections on the other side.

According to the exemplary aspect, a maximum bandwidth is multiplied by a number of the connections. Thus, even with a small TCP window (e.g., 1 MB) and with the high latency of the network (e.g., a channel RTT of 200 msec), the system is no longer limited by a speed of 5 MB/sec, but has the speed of 5 MB*N connections. Any packet losses are dispersed over multiple connections. This has a positive effect on the network capacity as the speed does not decrease after just a few losses and an increase in the size of the TCP window is not required. Note that the number of connections N can be dynamically controlled (increased or decreased) based on network conditions. The proposed method and system significantly improve quality of long distance (e.g., intercontinental) packetized data transfers.

As a further option, in select aspects each data stream can have its own routing to speed up transfers. For example, if several networking cards (Ethernet, Wi-Fi, etc.) are available, then some or all of them can be utilized for data transfers. As described above, the selection and prioritization of the various hardware and virtual interfaces available may be determined by policies assigned to a given use or to the computer, set by the application in response to preset conditions or criteria, or set by the user.

Also, in some aspects intermediate servers can be used to optimize routing and speed up transfers. For example, data from New Zealand to Europe can go through both Asian or US intermediate servers. Thus, proxying "somewhere" helps transmission to proceed by some other route (rather than a default direct connection) and thus creates another path to the server with additional bandwidth. In select aspects, the application may be configured to select an intermediate server (or plurality of intermediate servers) based upon a policy or configuration file, or to automatically select an optimal route for the transmission. For example, the application may be configured to measure one or more network parameters as discussed above, or to query potential intermediate servers for diagnostic or status information (e.g., available bandwidth) in order to select an efficient route through one or more intermediate servers that may be available. In select aspects, the application may be configured with a list of potential intermediate servers (e.g., corporate data centers) and may select a route based upon any of the network conditions or parameters described herein, based upon geographic proximity, or based upon any other priority rules. Furthermore, in select aspects a user may be prompted to choose a route or to select one or more intervening servers.

One of ordinary skill will appreciate that any of the optimization methods disclosed herein may be applied by the intervening servers in addition to at the proxy server and front end server, in order to optimize the overall transmission of data. For example, transmission of data from the application to a first intervening server may involve separation of the data to be transferred into two or more data streams, with the data streams collected and recombined at the intervening server prior to retransmission to another intervening server or to the proxy server. In alternative aspects, the parallel data streams transmitted by the application to the one or more intervening servers may be maintained as separate data streams until receipt at the final proxy server.

Figure 4:
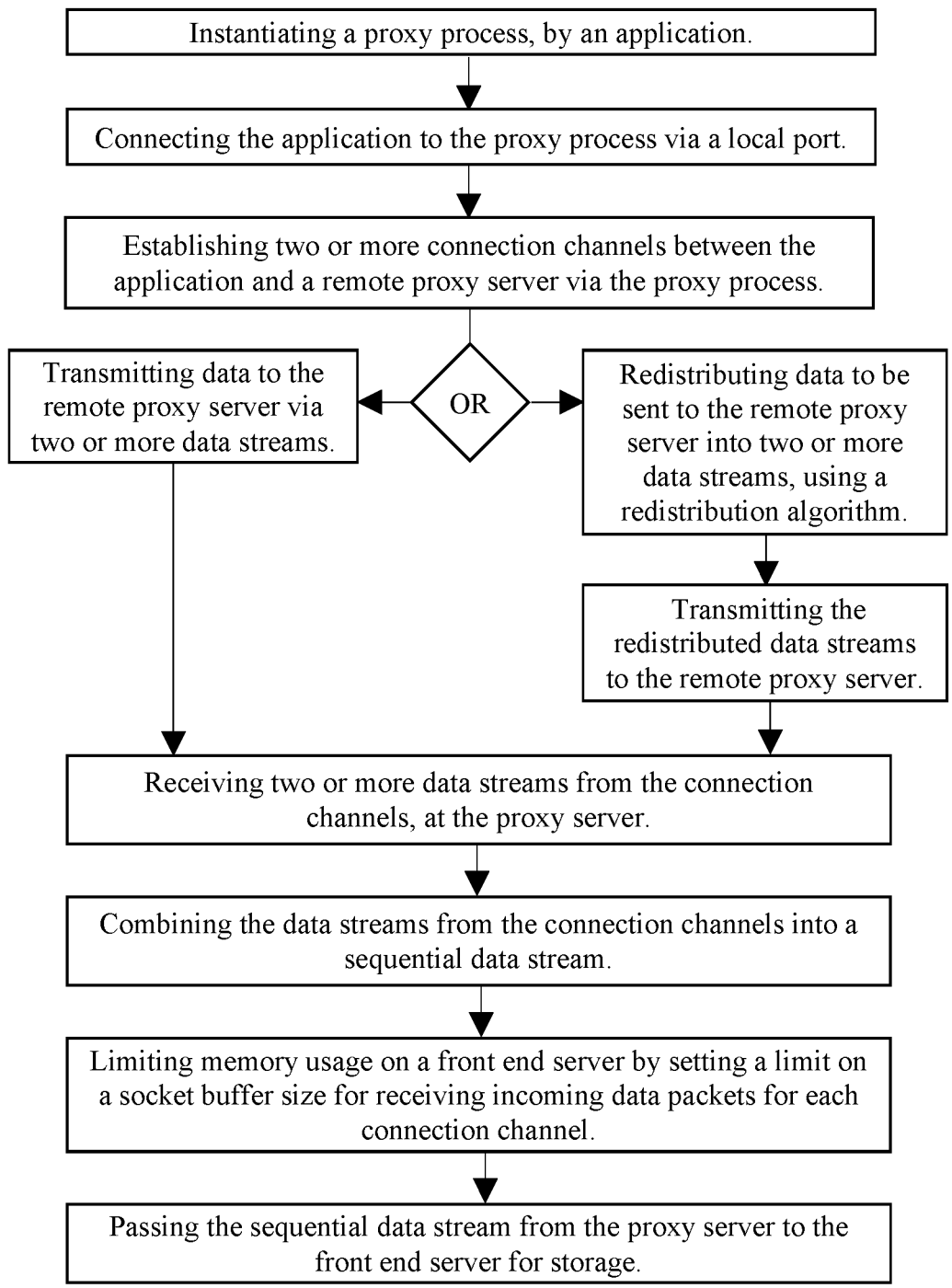
FIG. 4 is a flowchart representing a general aspect of a method or system according to the present disclosure.

An exemplary aspect of the present disclosure is further illustrated by the flowchart contained in FIG. 4. This method shown by this figure implements the general architecture shown in FIG. 1 and described above. In particular, FIG. 4 further illustrates that the data sent from the application via the proxy process may be transmitted directly or redistributed prior to transmission to a proxy server (or in alternative aspects to an intervening intermediate server). Redistribution may entail, e.g., selecting and/or rearranging data to be sent via the two or more connections into two or more data streams, based on any parameter and/or using any algorithm suitable for a given implementation. In some aspects, data may be redistributed based upon network conditions, bandwidth, or any other parameter related to connection quality or throughput. Data may also be redistributed based upon prioritization rules pertaining to the data itself or to the available connections or interfaces. In some aspects, data may be redistributed to prioritize transmission through a particular hardware interface (e.g., a first connection using a wired interface rather than a second connection using a wireless interface). In other aspects, data may be redistributed to ensure that high priority data is transmitted via the connection with the highest available bandwidth, or to ensure that a secure connection is used. In alternative aspects, data may also be sent directly without a redistribution step. Though not shown in this particular figure, in some aspects data to be transmitted may also be encrypted at any stage of the process prior to transmission.

Figure 5:
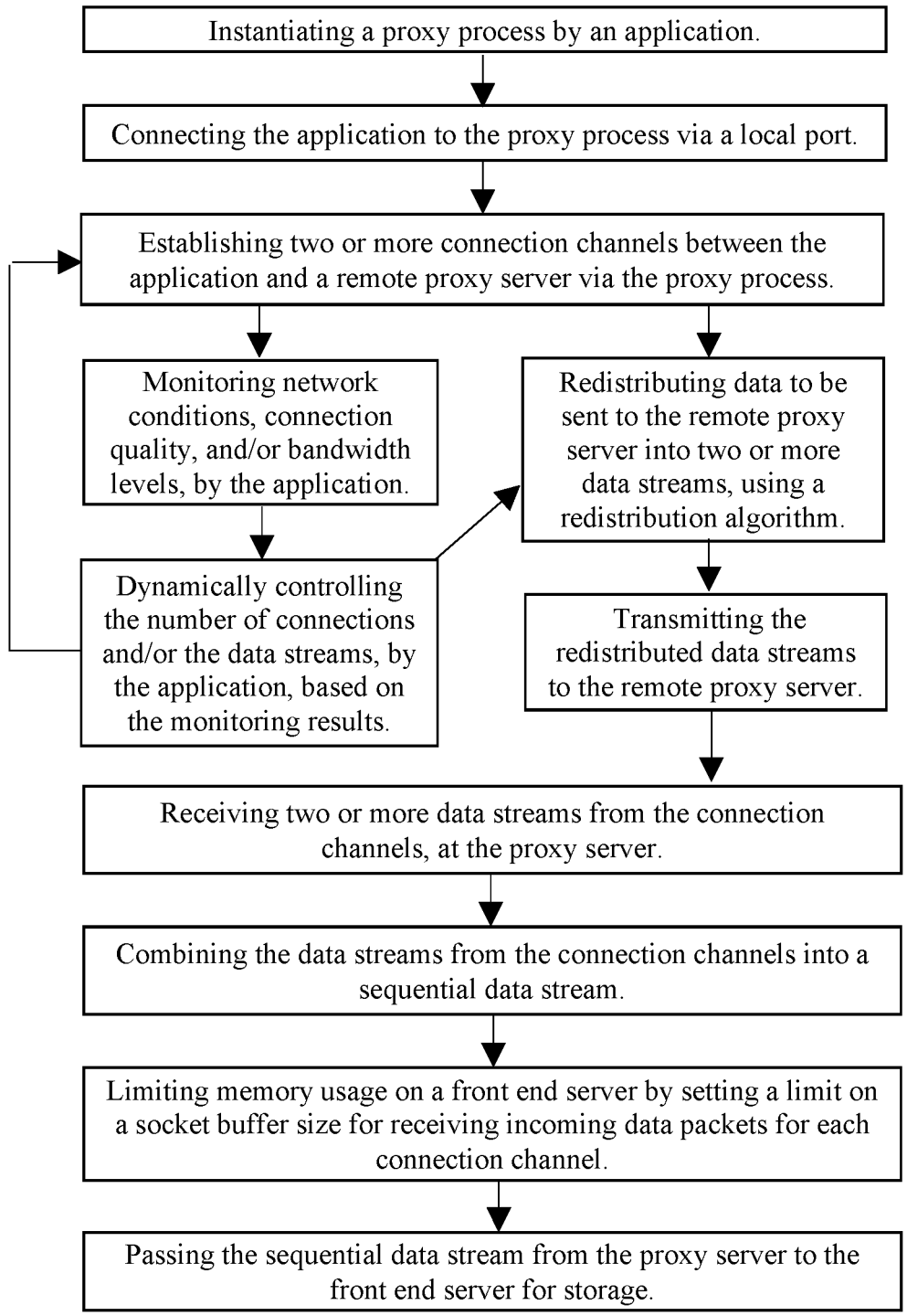
FIG. 5 is a flowchart representing an alternative general aspect of a method or system according to the present disclosure.

Turning to FIG. 5, which contains a flowchart illustrating an alternative aspect of the disclosure, it is further contemplated that the application may monitor network conditions, connection quality and/or bandwidth levels and dynamically control the number of connections and/or the data streams, based on the monitoring results. Monitoring may be initiated at any stage in the process and may be continuous or recurring (e.g., at a predetermined or user selected interval). Monitoring may also be triggered based upon a predetermined trigger (e.g., in the event of a given number of failed connection attempt to an intermediate server or the proxy server). Exemplary parameters that may be monitored include, as noted above, network conditions, connection quality, and/or bandwidth levels. However, it should be readily appreciated that any parameter relevant to computer networking or data transmission may be monitored. Similarly, it is understood that monitoring may be limited to a single parameter, or a plurality of parameters, which may be fixed or varied during the monitoring process. Monitoring may be accomplished by the application directly measuring the one or more selected parameters, by querying a network resource, and/or by receiving monitoring data from a network resource or other external source. Based on the results of the monitoring, the application may open, close, or otherwise vary the connections and/or adjust the data streams. For example, if monitoring reveals that low bandwidth is available via the current connections, additional or alternative connections to the proxy server or intermediate server may be established. In the case of data transmission to an intervening intermediate server, the monitoring results may also be used to determine whether an alternative intermediate server should be used for routing the transmission to the proxy server, in which case a set of two or more connections to said alternative server may then be established. In some aspects, the number of data streams and the content of the data streams may be adjusted in view of the one or more monitored parameter(s). Data streams may be redistributed across the existing (or new) connections. Similarly, data to be sent via the preexisting two or more data streams may be redistributed so that it is transmitted via an alternative preexisting or newly established data stream.

Figure 6:
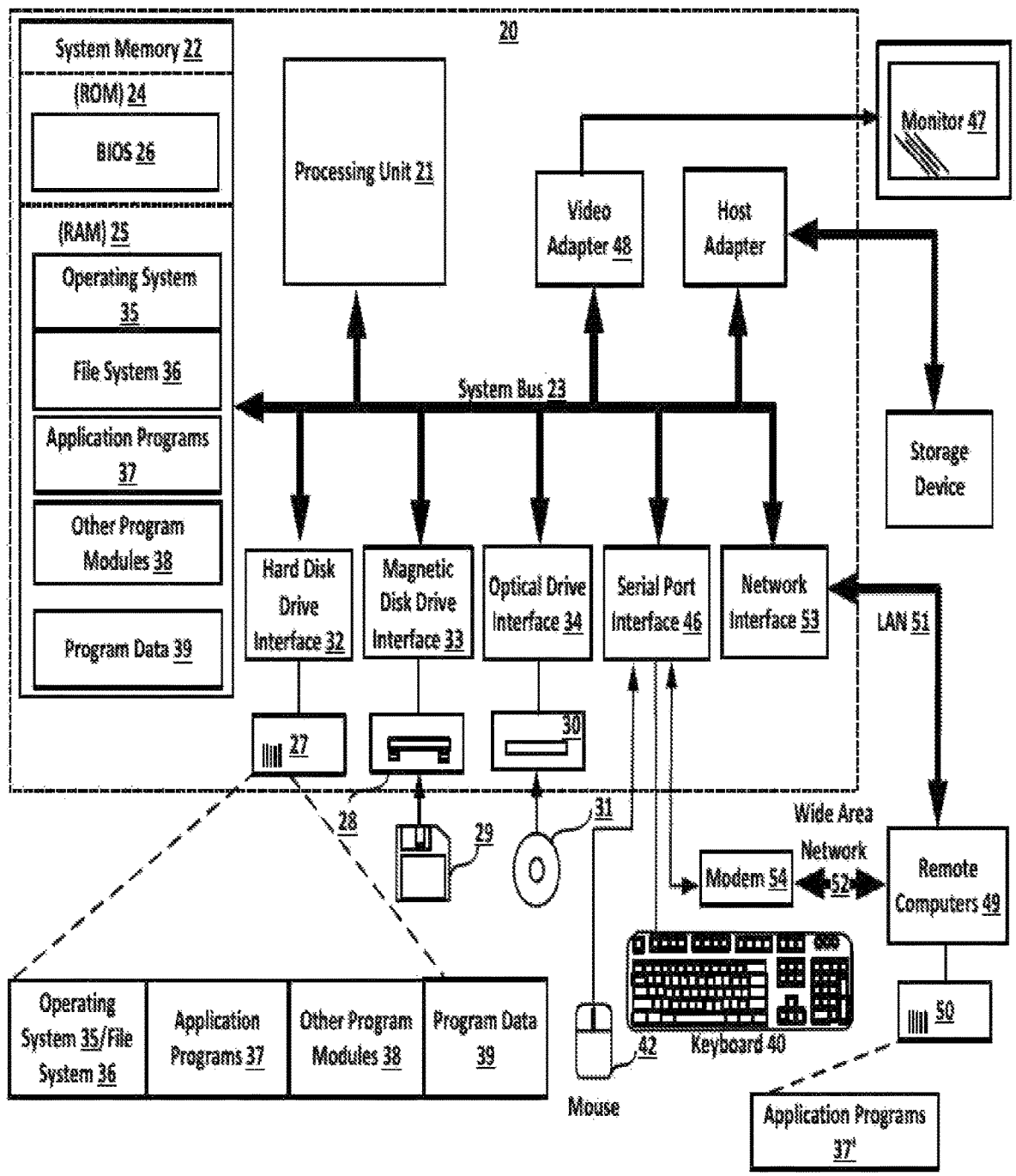
FIG. 6 illustrates an exemplary computer or a server that can be used to implement an exemplary aspect of the disclosure.

With reference to FIG. 6, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, e.g., during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for optimizing network connections between a host device and a backup server via a proxy server, the method comprising:
   providing a backup application to the host device, wherein the backup application is configured to backup data from the host device to the backup server by establishing a plurality of TCP channels between the backup application and the proxy server, wherein the backup application distributes the backup data as data streams across the plurality of TCP channels;
   receiving, at the proxy server, the data streams via the plurality of TCP channels and combining the received data streams into a sequential data stream for transmitting the sequential data stream to the backup server for storage;
   providing instructions to polling sockets at the backup server; and
   configuring the backup server to receive the sequential data stream from the proxy server by setting a limit on a socket buffer size of the backup server for receiving incoming data packets at the backup server for each TCP channel by determining that an incoming portion of data is out of order, and in response, leaving the portion of data in a socket buffer associated with a socket established on the backup server, stopping polling of the socket, and forcing an operating system of the backup server to allocate space in an application buffer for the portion of data.

2. The method of claim 1, further comprising a step of redistributing the data streams over the TCP channels using a redistribution algorithm.

3. The method of claim 1, further comprising a step of dynamically controlling the number of TCP channels and/or data streams, by the application, based upon network conditions, connection quality, or bandwidth levels.

4. The method of claim 1, further comprising the steps of:
   transparent proxying of local TCP connections via DNS hooking; and
   returning back local addresses that are transparently proxied to a remote front end server.

5. The method of claim 4, wherein the DNS hooking is implemented by a DNS-resolver.

6. The method of claim 1, wherein the proxy server resides on a cloud infrastructure.

7. The method of claim 1, wherein the data streams comprise packets and the data streams are combined into a sequential data stream at the proxy server based upon data contained in the packets' headers.

8. The method of claim 1, wherein the data streams comprise packets and each packet incoming into a socket buffer of the proxy server is read into an application buffer limited in size to 64 KB.

9. The method of claim 1, wherein a remote front end server receives the sequential data stream from the proxy server by:
   reading the incoming data packets for each TCP channel into a socket buffer; reading the socket buffer data packets into an application buffer having a preselected size of 64 KB or less, wherein a separate application buffer is allocated for each TCP channel; and
   receiving the application buffer data packets at one or more incoming sockets.

10. A system for optimizing TCP network connections, the system comprising a processor configured to:
    provide a backup application to a host device, wherein the backup application is configured to backup data from the host device to a backup server by establishing a plurality of TCP channels between the backup application and the remote proxy server via a proxy process, wherein the backup application distributes the backup data as data streams across the plurality of TCP channels;
    receive, at the proxy server, the data streams via the plurality of TCP channels and combine the received data streams into a sequential data stream for transmitting the sequential data stream to the backup server for storage;

provide instructions to polling sockets at the backup server; and configuring the backup server to receive the sequential data stream from the proxy server by setting a limit on a socket buffer size of the backup server for receiving incoming data packets at the backup server for each TCP channel by determining that an incoming portion of data is out of order, and in response, leaving the portion of data in a socket buffer associated with a socket established on the backup server, stopping polling of the socket, and forcing an operating system of the backup server to allocate space in an application buffer for the portion of data.

11. A system according to claim 10, wherein the processor is further configured to: redistribute the data streams over the TCP channels using a redistribution algorithm.

12. A system according to claim 10, wherein the processor is further configured to: dynamically control the number of TCP channels and/or data streams, by the application, based upon network conditions, connection quality, or bandwidth levels.

13. A system according to claim 10, wherein the processor is further configured to: transparently proxy local TCP connections via DNS hooking; and
return back local addresses that are transparently proxied to a remote front end server.

14. A system according to claim 13, wherein the DNS hooking is implemented by a DNS-resolver.

15. A system according to claim 10, wherein the proxy server resides on a cloud infrastructure.

16. A system according to claim 10, wherein the data streams comprise packets and the data streams are combined into a sequential data stream at the proxy server based upon data contained in the packets' headers.

17. A system according to claim 10, wherein the data streams comprise packets and each packet incoming into a socket buffer of the proxy server is read into an application buffer limited in size to 64 KB.

18. A system according to claim 10, wherein the proxy server is configured to receive the sequential data stream from the proxy process by:
reading the incoming data packets for each TCP channel into a socket buffer;

reading the socket buffer data packets into an application buffer having a preselected size of 64 KB or less, wherein a separate application buffer is allocated for each TCP channel; and receiving the application buffer data packets at one or more incoming sockets.

19. A computer program product embedded in a non-transitory computer-readable storage medium, the computer-readable storage medium comprising computer-executable instructions for optimizing network connections between a host device and a backup server via a proxy server, the medium comprising instructions for:

providing a backup application to the host device, wherein the backup application is configured to backup data from the host device to the backup server by instantiating a proxy process by establishing a plurality of TCP channels between the backup application and the proxy server, wherein the backup application distributes the backup data as data streams across the plurality of TCP channels;

receiving, at the proxy server, the data streams via the plurality of TCP channels and combining the received data streams into a sequential data stream for transmitting the sequential data stream to the backup server for storage;

providing instructions to polling sockets at the backup server; and configuring the backup server to receive the sequential data stream from the proxy server by setting a limit on a socket buffer size of the backup server for receiving incoming data packets at the backup server for each TCP channel by determining that an incoming portion of data is out of order, and in response, leaving the portion of data in a socket buffer associated with a socket established on the backup server, stopping polling of the socket, and forcing an operating system of the backup server to allocate space in an application buffer for the portion of data.

20. The computer program product of claim 19, further comprising instructions for: dynamically controlling the number of TCP channels and/or data streams, by the application, based upon network conditions, connection quality, or bandwidth levels.

* * * * *